(12) United States Patent
Coates

(10) Patent No.: X362
(45) Date of Patent: Apr. 1, 1802

(54) SAW MILLS

(76) Inventor: Moses Coates

Moses Coates, of Pennsylvania.

Letters Patent. Dated April 1, 180[illegible].

The Schedule referred to in these Letters Patent, and making part of the same, containing a description in the words of the said Moses Coates himself of his improvement, In a Saw Mill.

Specification. This machine is put in motion by an arm extending from a shaft to the saw gate commanding three hands, one of which acts upon a small half circular rag attached to another Shaft or Roller; on this shaft there are two straps which command the other two hands in such manner that they are brought to act upon a Retroactive Rag, which is secured to the common rag wheel; the first of those hands is suspended by a strap held to the end of a lever; at the point of time when it shall be required that the log retreat from the saw this lever is put in motion by a slider attached to the other end playing in a joint, and extending in perpendicular direction down to the carriage, where it is elevated by a trigger. The hands that act in the ordinary way for feeding the saw are commanded by the motion of the above said roller, being likewise furnished with straps attached thereto and for the purpose of accelerating the motion of this roller, there is a preponderating principle suitably applied. The log is thus brought to retrograde motion. For the purpose of setting the log to the required distance, there is a slider with a rag iron on the top, a pendant at the bottom, and a friction wheel playing in an open ended mortice, this slider passes through one of the main Posts and by one of the fender Posts. It is brought forward by an oblique cleat catching the pendant; this cleat is held fast by a screw to the sliding Dog on the main head Block: The same kind of means are used for moving the stump end of the log which is accommodated with a sliding head block. The friction wheels are so stationed as to move the log at the point of time when the saw is relieved. Thus in succession the log continues to be moved until the gauge relieves the lever which commands the water gate and the Mill is stopped.

Witnesses.
William Crawford. }
Christopher [illegible] Thom. }

Moses Coates.

( [illegible] )

DRAFTSMAN'S DIVISION.

*All communications should be addressed to* "The Commissioner of Patents, Washington, D. C."

2—328 a.

*DEPARTMENT OF THE INTERIOR,*

United States Patent Office,

*Washington, D. C.,* . . . . . . . . *189*. . .

*SIR:*

*The printed* copies *of Patent No.* Moses Coates Apr 1, 1802 are *exhausted.*

*As soon as printed a copy will be mailed you to complete your order.*

*By direction of the Commissioner:*

*Very respectfully,*

*Chief Clerk.*

31436-97-5m